United States Patent [19]

Hattori et al.

[11] Patent Number: 5,457,588
[45] Date of Patent: Oct. 10, 1995

[54] LOW PROFILE HYDRODYNAMIC MOTOR HAVING MINIMUM LEAKAGE PROPERTIES

[75] Inventors: Shinobu Hattori; Yasuhiro Higuchi, both of Kyoto; Yoshito Oku, Osaka, all of Japan

[73] Assignee: Nippon Densan Corporation, Kyoto, Japan

[21] Appl. No.: 122,194

[22] Filed: Sep. 15, 1993

[30] Foreign Application Priority Data

Sep. 22, 1992 [JP] Japan ..................... 4-252720
Dec. 2, 1992 [JP] Japan ..................... 4-350425
Dec. 7, 1992 [JP] Japan ..................... 4-351683

[51] Int. Cl.$^6$ .................. G11B 17/02; H02K 7/08; H02K 5/16
[52] U.S. Cl. .................. 360/99.08; 360.0/98.07; 360.0/99.04; 310/67 R
[58] Field of Search ............... 360/98.07, 99.04, 360/99.08, 97.02; 310/67 R, 90, 91, 144, 480, 119, 124; 369/258, 261, 264, 269

[56] References Cited

U.S. PATENT DOCUMENTS 2,945,730  7/1960  Murray et al. ............... 384/480
4,348,067  9/1982  Tooley ....................... 384/144
5,142,173  8/1992  Konno et al. ............... 310/67 R
5,246,294  9/1993  Pan .......................... 384/119

FOREIGN PATENT DOCUMENTS 3-60355   3/1991  Japan .
3-149410  6/1991  Japan .

OTHER PUBLICATIONS

E. P. Stahl, *Selection, Care and Installation of Anit-Friction Bearings,* Dec. 1955, Machinery, pp. 174–178.

*Primary Examiner*—Stuart S. Levy
*Assistant Examiner*—William R. Korzuch
*Attorney, Agent, or Firm*—McCormick, Paulding & Huber

[57] ABSTRACT

A spindle motor comprises a rotary sleeve; a rotor hub which is integrally rotated with the rotary sleeve; a stationary sleeve; and a stationary support extending upwardly from the stationary part, the rotary sleeve being fitted onto the outer peripheral surface of the stationary support, and radial and thrust hydrodynamic bearings being provided on the relative sliding surfaces of both rotary sleeve and stationary support. A pair of annular grooves which partially overlap each other in the axial direction are peripherally provided on the rotary sleeve and stationary support, thereby providing a labyrinth chamber to suppress the outflow of the lubricant.

16 Claims, 12 Drawing Sheets

LOW PROFILE HYDRODYNAMIC MOTOR HAVING MINIMUM LEAKAGE PROPERTIES

FIELD OF THE INVENTION

The present invention relates to a spindle motor which utilizes one or more hydrodynamic bearings and which is used for driving recording media or the like.

BACKGROUND OF THE INVENTION

Since the equipment such as personal computers and the like using recording media has been made smaller in size and larger in capacity, making the spindle motors for driving recording media incorporated into the equipment smaller in size and larger in capacity is also demanded. Along with this, it is further required to also make the bearings of the spindle motors smaller in size and higher in accuracy.

Many ball bearings have hitherto been adopted as bearings used for the spindle motors. However, as making spindle motors smaller in size, particularly smaller in outer diameter, proceeds, use of the ball bearings of smaller outer diameters corresponding thereto causes the inner and outer races to be easily deformed as the motors are assembled, whereby realization of a sufficient accuracy of rotation is apt to be difficult in practice. Moreover, problems of noise and vibration are also inclined to occur.

In the case of the spindle motors for driving recording media, the high speed rotation accompanied by the smaller outer diameter thereof is required, so, the above-mentioned problems are further promoted. In addition, the accuracy of finishing the ball bearings has a certain limitation in spite of whether the outer diameters are large or small, and the case where the specification of the requirements is not satisfied is forecasted. For that reason, for example, JPA 149410 (1991) discloses a spindle motor adopting a hydrodynamic bearing construction, which is so constructed that a generally smaller sized (for example, a rotor hub having an outer diameter of approximately 40 mm or less) spindle motor is provided with a rotary sleeve at the inner peripheral side of the base of a substantially bowl-shaped rotor hub, and the rotary sleeve is fitted onto and rotatably supported by the outer periphery of a stationary support at the stator side, the hydrodynamic bearing construction being such that on the surfaces of the rotary sleeve and stationary support which come into sliding contact with each other, one or more grooves of predetermined shape are provided and filled with a lubricant.

However, in the case where such a hydrodynamic bearing construction is adopted, making the bearing parts smaller in size can be achieved more than making a ball bearing smaller thereby, leakage of a lubricant becomes a problem. When the lubricant leaks out of the motor, for example, it stains recording media or the like fitted onto and fixed to the rotor hub; therefore, such a staining must be avoided. In order to surely prevent leakage of the lubricant, use of a magnetic fluid seal is preferable and such an example is disclosed, for example, in JPA 60355 (19991). However, with such a magnetic fluid seal, it is considerably difficult, for example, to pour the magnetic fluid into the vicinity of the hydrodynamic radial bearing positioned at the middle portion of the interior of the rotor hub. In order to avoid such a problem, if an attempt is made to provide the hydrodynamic bearing on the outer periphery portion of the rotor hub. However, in this case, a large quantity of magnetic fluid is necessary, thereby bringing about an increase in cost.

SUMMARY OF THE INVENTION

An object of the invention is to provide a spindle motor utilizing one or more hydrodynamic bearings, in which leakage of a lubricant to the outside of the motor is effectively prevented.

Another object of the invention is to prevent staining of disks by a lubricant.

A further object of the invention is to provide a smaller-sized spindle motor.

The outline of typical spindle motors of the invention is explained below. According to the present invention, there is provided a spindle motor comprising a rotary sleeve means; a rotor hub means which is integrally rotated with said rotary sleeve means; a stationary part; a stationary support means provided on said stationary part, said rotary sleeve means being fitted onto said stationary support means; radial and thrust hydrodynamic bearings filled with a lubricant on the relative sliding surfaces of said rotary sleeve means and said stationary support means; and a pair of annular grooves which partially overlap each other in the axial direction and which are peripherally provided on said rotary sleeve means and said stationary support means above or below said hydrodynamic bearings, thereby providing a labyrinth chamber to suppress the outflow of said lubricant.

In further accordance with another invention, there is provided a spindle motor comprising a stationary part; a stationary sleeve means provided on said stationary part; a rotor hub means; a rotary support means which is integrally rotated with said rotor hub means; said rotary support means being inserted into said stationary sleeve means; radial and thrust hydrodynamic bearings filled with a lubricant on the relative sliding surfaces of said rotary support means and said stationary sleeve means; and a pair of annular grooves which partially overlap each other in the axial direction and which are peripherally provided on said rotary support means and said stationary sleeve means above or below said hydrodynamic bearings, thereby providing a labyrinth chamber to suppress the outflow of said lubricant.

In the spindle motor constituted as described above, the lubricant filled in the hydrodynamic bearings attempts to flow through the minute gaps between the inner peripheral surface of the rotary sleeve or stationary sleeve and the outer peripheral surface of the stationary support or rotary support (between the relative sliding surfaces) and then flow out to the exterior; however, in the positions of the corners which define the annular groove of the rotary sleeve or stationary sleeve and the annular groove of the stationary support or rotary support constituting a labyrinth chamber, a surface tension acts on the surface of the lubricant leaked out into the labyrinth chamber to thereby suppress the flow of the lubricant.

According to further invention, there is provided a spindle motor comprising a rotary sleeve means; a rotor hub means which is integrally rotated with said rotary sleeve means; a stationary part; a stationary support means provided on said stationary part, said rotary sleeve means being fitted onto said stationary support means; radial and thrust hydrodynamic bearings filled with a lubricant on the relative sliding surfaces of said rotary sleeve means and said stationary support means; one or more lubricant holding gap parts having radial gaps larger than those of said radial hydrodynamic bearings; and one or more enlarged gap parts having radial gaps larger than those of said lubricant holding gap parts, said lubricant holding gap parts being adjacent at one side thereof as viewed in the axial direction to said radial hydrodynamic bearings and adjacent at the other side to said enlarged gap parts, and the radial gaps of said lubricant holding gap parts being dimensioned to such a degree that the lubricant leaked out of said radial hydrodynamic bearings can be held in said lubricant holding gap parts by capillarity.

In further accordance with further invention, there is provided a spindle motor comprising a stationary part; a stationary sleeve means provided on said stationary part; a rotor hub means; a rotary support means which is integrally rotated with said rotor hub means; said rotary support means being inserted into said stationary sleeve means; radial and thrust hydrodynamic bearings filled with a lubricant on the relative sliding surfaces of said rotary support means and said stationary sleeve means; and one or more lubricant holding gap parts having radial gaps larger than those of said radial hydrodynamic bearings; and one or more enlarged gap parts having radial gaps larger than those of said lubricant holding gap parts, said lubricant holding gap parts being adjacent at one side thereof as viewed in the axial direction to said radial hydrodynamic bearings and adjacent at the other side to said enlarged gap parts, and the radial gaps of said lubricant holding gap parts being dimensioned to such a degree that the lubricant leaked out of said radial hydrodynamic bearings can be held in said lubricant holding gap parts by capillarity.

With the spindle motor constituted as described above, in the case where the rotation is stopped and a relative inclination is produced between the shaft body and the sleeve body, the excess lubricant which can not be held in the radial hydrodynamic bearings leaks out into the lubricant holding gap parts enlarged in the radial direction and adjacent to the radial hydrodynamic bearings. However, such lubricant is held in the lubricant holding gap parts by capillarity, and is prevented from flowing out into the enlarged gap parts further enlarged in the radial direction and adjacent to the lubricant holding gap parts.

BRIEF DESCRIPTION OF THE DRAWINGS

These and other objects, features and advantages of the invention will become more apparent from the following description when taken in connection with the accompanying drawings which show several embodiments in accordance with the present invention, and wherein.

DETAILED DESCRIPTION OF PREFERRED EMBODIMENTS

Now, embodiments of the invention will be explained with reference to the drawings.

Figure 1:
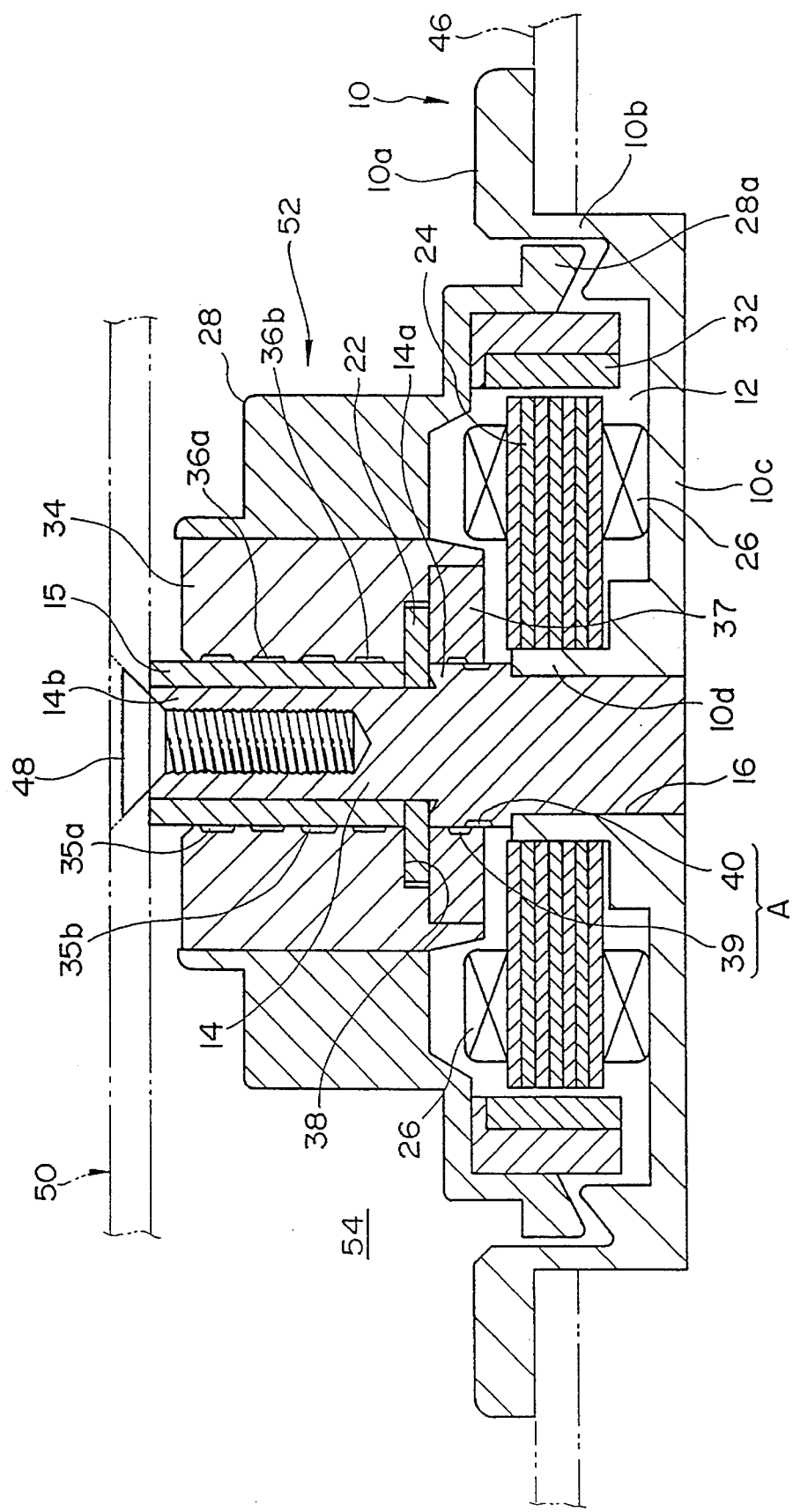
FIG. 1 is a sectional view showing a first embodiment of a spindle motor according to the present invention.
Figure 2:
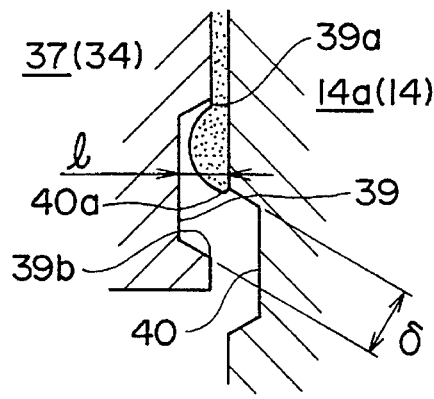
FIG. 2 is an enlarged view of a labyrinth chamber of the motor in FIG. 1.
Figure 3:
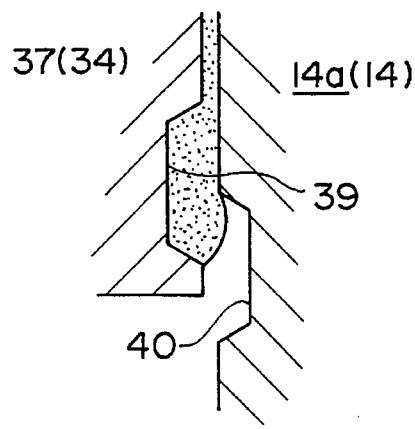
FIG. 3 is an explanation view of an operation of the labyrinth chamber in FIG. 2 which suppresses the outflow of a lubricant.

FIGS. 1 to 3 illustrate a first embodiment of the present invention, and in these drawings, the present invention is applied to a spindle motor for driving a hard disk; however, it goes without saying that the spindle motor according to the invention can also be used for any recording media other than the hard disk.

Referring to FIG. 1, Reference 10 designates a bracket (stationary part), which comprises a flange 10a, an outer peripheral wall 10b positioned inwardly of the flange 10a, a first annular bottom 10c formed inwardly at the bottom of the outer peripheral wall 10b, and an inner peripheral wall 10d provided along the inner periphery of the first bottom 10c. The outer peripheral wall 10b and the first bottom 10c defines an annular recess 12 which opens upwardly.

Reference 14 designates a cylindrical stationary support, the lower portion of which is fitted into and fixed to a through hole 16 formed by the inner peripheral wall 10d of the bracket 10, and the stationary support 14 extends upwardly from the bracket 10. Substantially at the middle in the longitudinal direction of the stationary support 14 is formed a flange 14a carried on the inner peripheral wall 10d, and on the flange 14a is mounted a disk-shaped thrust bearing member 22 which is integrally formed with the stationary support 14 along with a cylindrical stationary sleeve 15 fitted onto the outer circumference of an upwardly extending portion, which is of smaller diameter, of the stationary support 14.

The thrust bearing member 22 engages a recess 38 provided on the inner peripheral surface of a rotary sleeve 34 as described below, and thereby constitutes a hydrodynamic thrust bearing. On the upper and lower surfaces of the thrust bearing member 22 which provide sliding surfaces are each formed a spiral groove (not shown) for producing a force of rotational floatation.

Reference 24 indicates a stator core secured to the outer peripheral wall surface of the inner peripheral wall 10d of the bracket 10, and 26 indicates a stator coil wound around the stator core 24.

Reference 28 designates a rotor hub of cup type which opens downwardly and which is formed with a center hole, on the inside of the outer wall 28a of the rotor hub 28 is provided a rotor magnet 32 enclosing the stator coil 26, and into the center hole of the rotor hub 28 is fitted and fixed the rotary sleeve 34 cylindrical in shape and large in wall thickness, so that it is integrally formed with the rotor hub 28.

The rotary sleeve 34 is fitted onto the outer periphery of the stationary sleeve 15 of the stationary support 14, and, at the same time, on the inner peripheral surface of the rotary sleeve 34 (the peripheral surface enclosing the outer periphery of the stationary sleeve 15) are provided two vertically spaced herringbone grooves 36a and 36b for production of a floating force, which are filled with a lubricant so that hydrodynamic radial bearings which allow smooth relative rotation are provided in axially spaced relation. Further, between the upper and lower hydrodynamic radial bearings is provided an oil reserving groove 35b for preventing the loss of torque on the inner circumferential surface of the rotary sleeve 34. In addition, an oil reserving groove 35a for absorbing a change in volume of a lubricant due to thermal expansion is provided upwardly of the upper hydrodynamic radial bearing.

In the lower end portion of the rotary sleeve 34 is fitted and fixed a disk-shaped bush 37 having a large thickness and is formed a recess 38 which is engaged by the thrust bearing member 22 integrally formed with the stationary support 14. At the lower end of the inner circumferential surface of the bush 37 fixed to the rotary sleeve 34 is provided a first annular groove 39 in the form of a substantially-shaped trapezoid which is larger in depth than the gap between the rotary sleeve 34 and the bush 37. On the other hand, in the position corresponding to the bush 37 on the outer peripheral surface of the stationary support 14 is provided a second annular groove 40 in the form of a substantially-shaped trapezoid which partially overlaps the annular groove 39 of the bush 37 in the axial direction, which, at the same time, has the same depth as that of the annular groove 39 which opens partially into the second annular groove 40 downwardly of the bush 37, so that a labyrinth chamber A for suppressing the outflow of a lubricant is provided at the lower end of the hydrodynamic radial bearing.

The spindle motor constituted as described above is incorporated into a hard desk driving device, for example, by fixing the flange 10a of the bracket 10 to the base 46 of the hard desk driving device and, then, securing the top end of the stationary support 14 to a top plate 50 of the hard desk driving device by means of a screw 48.

Upon supplying a predetermined direct current to the coil 26, the electromagnetic interaction of a magnetic field generated by the coil 26 and the rotor magnet 32 rotates the rotor hub 28. Rotation of the rotor hub 28 causes a rise in temperature of the motor, a pressure, or a centrifugal force to act on a lubricant. This further causes the lubricant within the radial bearing and the thrust bearing to pass through a minute gap between the outer peripheral surface of the stationary sleeve 15 and the inner peripheral surface of the rotary sleeve 34, a minute gap between the thrust bearing member 22 and the recess 38, and then, a minute gap between the outer peripheral surface of the flange 14a on the stationary support and the inner peripheral surface of the bush 37, attempting to made the lubricant flow downwardly from the bush 37.

As shown in FIG. 2, the lower end position of the flowing-down lubricant reaches the first annular groove 39, which becomes suddenly enlarged from the minute gap, and further, a portion of the lubricant also comes to the second annular groove 40 (comes to the position where the lower end portion of the lubricant reaches the corner 40a of the groove 40 from the corner 39a of the groove 39), so that a surface tension acts on the lubricant therein to suppress the flow of the lubricant. Moreover, as shown in FIG. 3, when the lubricant comes to fill the first annular groove 39, the flow of the lubricant is suppressed again by the surface tension. Further, also at the time of stoppage of the rotation of the motor, the lubricant is apt to flow downwards, however such a flow is also suppressed by the first annular groove 39 and the second annular groove 40.

In the modified form of a pair of annular grooves 39 and 40, the annular grooves 39 and 40 may be formed axially at a predetermined interval only on one of the relative sliding surfaces, for example, on the inner peripheral surface of the bush 37, thereby preventing the lubricant from flowing down to some degree. However, with the construction of the grooves being provided only on one of the relative sliding surfaces, the radial bearing extends axially by the amount of the grooves being provided axially, and, therefore, making the motor smaller in size can not be achieved. However, in the present embodiment, since the grooves are formed on each of the relative sliding surfaces so as to overlap with each other, the smaller-sized motor can be achieved and the lubricant can be prevented from flowing down.

Further, downwardly of the labyrinth chamber is formed a labyrinth-like space defined by the inner peripheral wall 10d, stator core 24, stator coil 26, rotor magnet 32, outer wall 28a of the rotor hub 28, first bottom 10c of the bracket 10 and outer peripheral wall 10b; therefore, even if the lubricant flows out of the labyrinth chamber A, such a space prevents the lubricant from leaking out of the spindle motor, that is, leaking into the hard desk chamber 54.

In addition, in the present embodiment, the bush 37 is integrally secured to the lower end of the rotary sleeve 34 to provide a function of radial bearing also to the inner peripheral surface of the bush 37, so that the radial bearing is lengthened in the axial length, and, accordingly, deviation of the axis of rotation of the rotor 52 is small.

Moreover, since the recess 38 of the rotary sleeve 34 for supporting the thrust bearing member 22 is defined by the rotation sleeve 34 having a large thickness and the bush 37 having a large thickness, rigid strength of the bearing part of the thrust bearing member is high.

Further, in the first embodiment, if the distance $\delta$ between the corner 39b at the lower side of the first annular groove 39 and the corner 40a at the upper side of the second annular groove 40 is set to a distance greater than the distance between the first annular groove 39 and the flange 14a, an effect of preventing a lubricant from flowing down is further strengthened.

Figure 4:
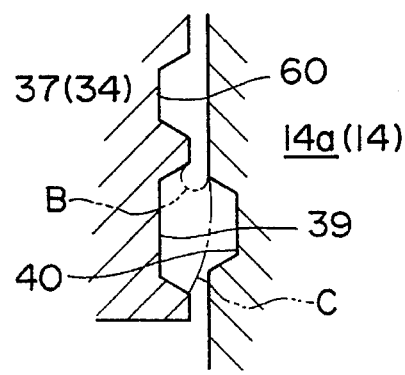
FIG. 4 is an enlarged sectional view showing a second embodiment of the present invention.

FIG. 4 is an enlarged view of a labyrinth chamber which is an essential portion of a second embodiment of the present invention.

In this embodiment, the second annular groove 40 of the stationary support 14 is smaller in width than the first annular groove 39 of the bush 37 (rotary sleeve 34), and the grooves 39 and 40 are provided in positions where they are facing with each other. The lubricant flowing down from the hydrodynamic bearing passes through the minute gaps similarly to the first embodiment, and the surface tension acts on it in the position shown by Reference B to thereby suppress the flow. In the position shown by Reference C, the flow is suppressed again.

Further, in this embodiment, a spiral groove 60 is formed on the inner peripheral surface of the bush 37 upwardly of the first annular groove 39, and the lubricant accumulated in the labyrinth chamber A is adapted to be returned to the hydrodynamic bearing through the spiral groove 60. Since the spindle motor as constituted above allows the lubricant which flows down into the labyrinth chamber A to be returned again to the hydrodynamic bearing through the spiral groove 60, the lubricant can be made sure not to flow out to the exterior.

Moreover, the spiral groove 60 shown in the second embodiment may be formed on the stationary support 14, and similar function and effects can be obtained.

Further, in the above-mentioned spindle motor, adhesives are used for fixing the fitting between the rotary sleeve 34 and the rotor hub 28, the fitting between the stationary support 14 and the stationary sleeve 15, the fitting between the bush 37 and the rotary sleeve 34, and for fixing the rotor magnet 32 to the rotor hub 28. Thermosetting adhesives using an anaerobic curing agent are preferable except for the positions where the rotor magnet 32 is fixed.

The reason for this is because, in the above-mentioned fitting positions, an ordinary adhesive is used, there is a danger in that if such an ordinary adhesive comes to be in an uncured state, it flows into the hydrodynamic generating part and the function thereof is obstructed; however, the adhesive using an anaerobic curing agent cures sufficiently in a considerably narrow gap without air, and, therefore, there is no occurrence of the adhesive flowing into the hydrodynamic generating part.

Also, in the above-mentioned first and second embodiments, the labyrinth chamber A is provided downwardly of the hydrodynamic bearing; however, it may be provided upwardly thereof instead of downwardly or both downwardly and upwardly (the first and second annular grooves may be provided).

FIGS. 5 to 10 illustrate a third embodiment of the present invention, and, in these drawings, the present invention is applied to a shaft stationary type of spindle motor.

Figure 5:
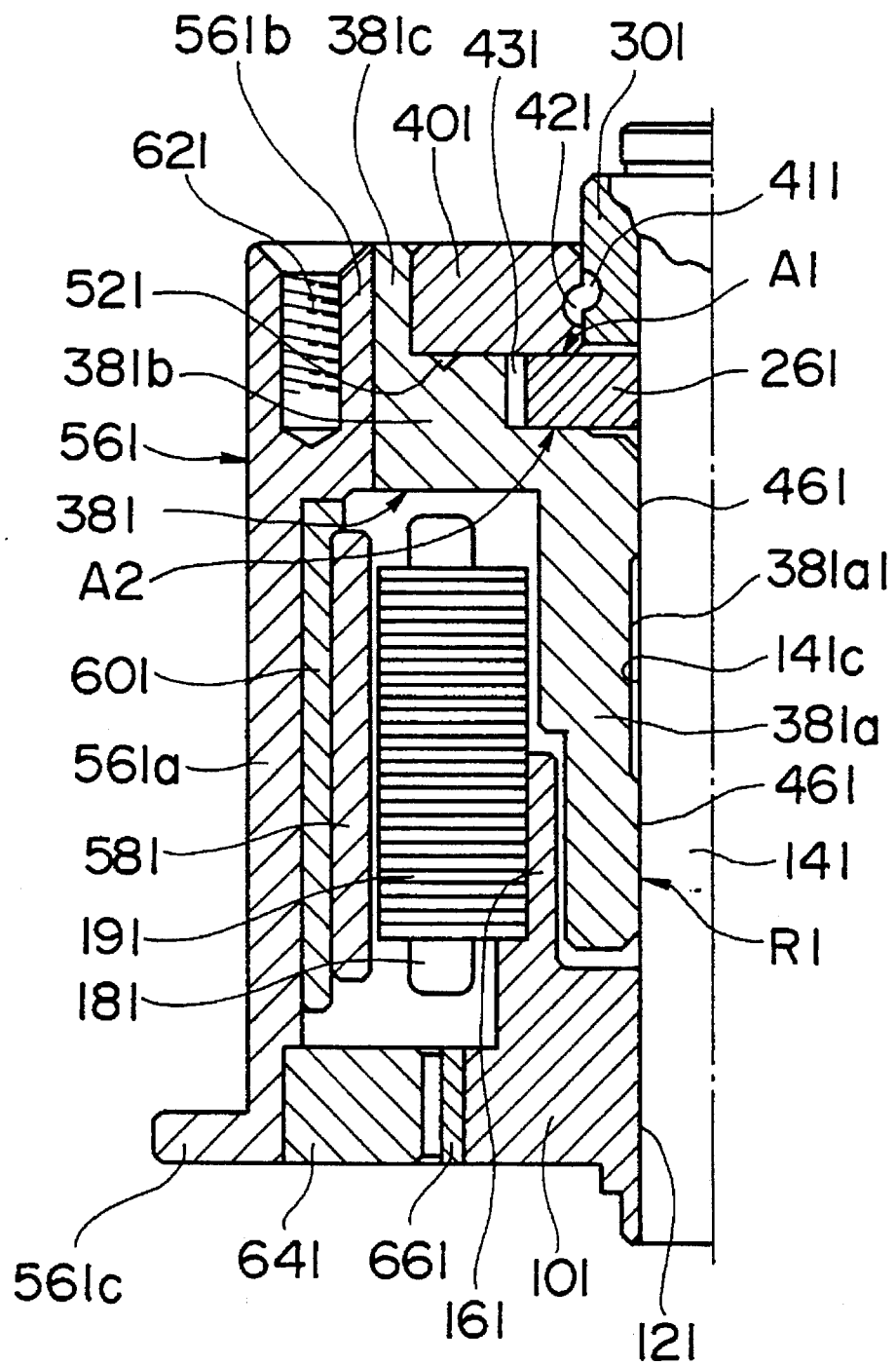
FIG. 5 is a half sectional view showing a third embodiment of a spindle motor according to the present invention.

Referring to FIG. 5, into a fitting hole 121 provided at the center of a bracket (stationary part) 101 is fitted and fixed the lower end portion of a cylindrical stationary support 141, which extends vertically from the bracket 101. On the outer peripheral portion of the fitting hole 121 of the bracket 101 is provided an annular projection 161 which projects upwardly, and to the outer periphery of the annular projection 161 is secured a stator core 191 around which a stator coil 181 is wound.

A thrust plate 261 in the form of an annular plate is fitted and fixed onto the outer periphery of the upper portion of the stationary support 141. Further, a substantially cylindrical first bush 301 is fitted and fixed onto the outer periphery of the upper end portion of the stationary support 141. The lower surface of the first bush 301 is positioned slightly above the upper surface of the thrust plate 261. The upper and lower surfaces of the thrust plate 261 are perpendicular to the cylindrical outer peripheral surface 141c of the stationary support 141. In this embodiment, the stationary support 141, thrust plate 261 and first bush 301 constitute a stationary part.

Figure 6:
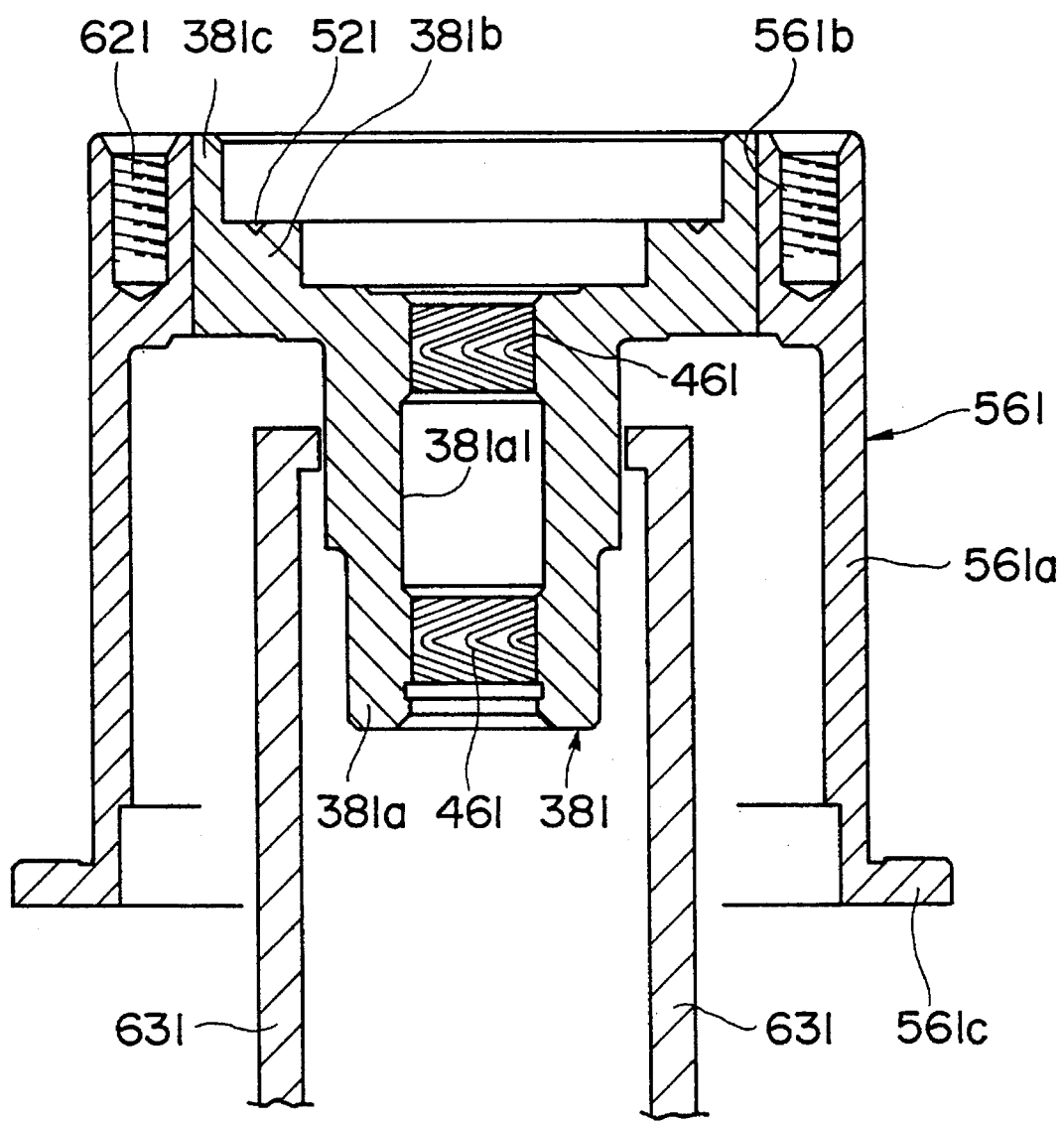
FIG. 6 is a sectional view of a rotary sleeve and a rotor hub shown in FIG. 5.

FIG. 6 is a sectional view of a rotary sleeve member 381 and a rotor hub 561.

The rotary sleeve member 381 comprises a sleeve portion 381a of small diameter, the inner peripheral surface 381a1 of which is a substantially cylindrical surface, an annular portion 381b projecting outwardly in the radial direction and upwardly from the upper end of the sleeve portion 381a, and an upward projection 381c extending upwardly from the outer periphery of the annular portion 381a. The sleeve portion 381a is fitted onto the outer periphery of the stationary support 141, and an annular second bush 401 is fitted into the upper projection 381c with a slight radial gap left between it and a first bush 301, and with a thrust plate 261 interposed between it and the upper end surface of the sleeve portion 381a. Accordingly, the rotary sleeve member 381 and the second bush 401 define an annular recess 431 which opens inwardly in the radial direction, and the outer periphery of the thrust plate 261 is fitted into the annular recess 431. In this embodiment, the sleeve body constituted by these rotation sleeve member 381 and second bush 401 is rotatable relative to the above-mentioned shaft body through a liquid lubricant (not shown in FIG. 5).

Figure 7:
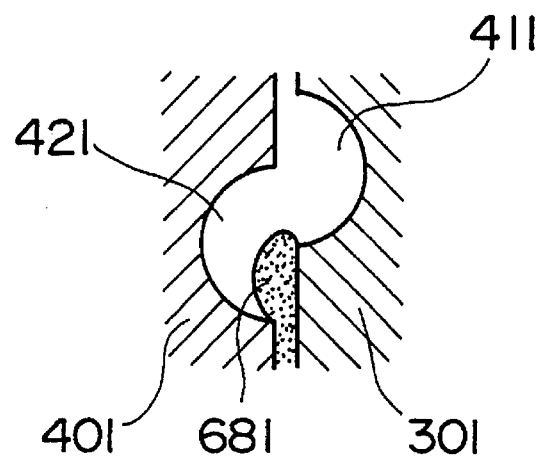
FIG. 7 is an enlarged sectional view of an essential portion between a second bush and a third bush shown in FIG. 5.
Figure 8:
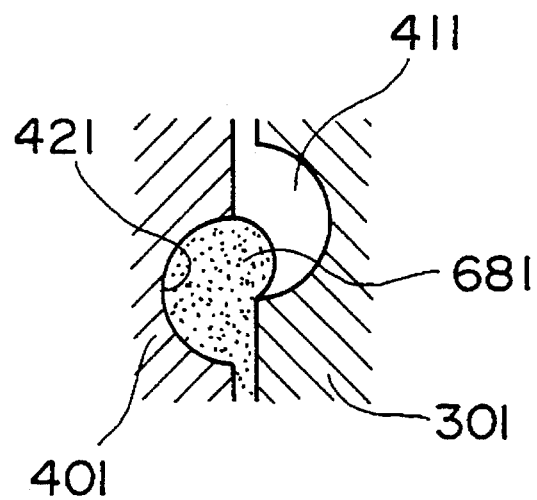
FIG. 8 is an explanation view of an operation of suppressing the outflow of a lubricant in a portion shown in FIG. 7.

FIGS. 7 and 8 are each an enlarged sectional view of an essential portion extending over the first bush 301 and the second bush 401.

A peripheral first concave groove 411 having a cross-section of a half circle and opening outwardly in the radial direction is provided on the outer peripheral portion of the first bush 301 so as to extend over the full periphery thereof, and a peripheral second concave groove 421 having a cross-section of a half circle and opening inwardly in the radial direction is provided so as to extend over the full periphery thereof. In any arbitrary cross section, the axial position of the lower end edge of the first concave groove 411 is substantially at the middle of the second concave groove 421, and the axial position of the upper end edge of the second concave groove 421 is substantially at the middle of the first concave groove 411, the positions of both end edges of both concave grooves 411 and 412 facing each other in offset relation.

A radial hydrodynamic bearing R1 is constituted by the inner peripheral surface 381a1 (radial sliding portion) of the sleeve portion 381a and the portion (radial receiving portion) opposite the inner peripheral surface 381a1 in the outer peripheral surface 141c of the stationary support 141. Over the full periphery of the upper and lower end portions in the inner peripheral surface 381a1 of the sleeve portion 381a are provided herringbone grooves 461 which cause the lubricant interposed between the sleeve portion 381a and the outer peripheral surface 141c of the stationary support 141 to produce a high pressure by the forward rotation (anticlockwise rotation as viewed from above in the drawing) of the rotary sleeve member 381. Further, such herringbone grooves may be provided on the outer peripheral surface 141c of the stationary support 141, and the adoption of any grooves other than the herringbone grooves is also possible.

The lower outer peripheral surface of the sleeve portion 381a is facing the inner peripheral surface of the annular projection 161 with a slight radial gap left therebetween. The upper portion of the sleeve portion 381a is enlarged in diameter and the outer peripheral surface thereof is facing the inner peripheral surface of the stator core 191 with a slight radial clearance left therebetween. The sleeve portion 381a, the bracket 101, and the stator core 191 opposite the sleeve portion 381a provide an effect like a labyrinth seal, preventing the lubricant from the radial hydrodynamic bearing R1 from dispersing to the exterior of the motor.

Figure 9:
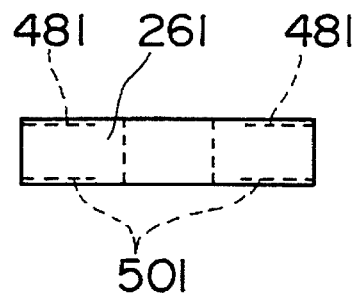
FIG. 9 is a front view of a thrust plate shown in FIG. 5.
Figure 10:
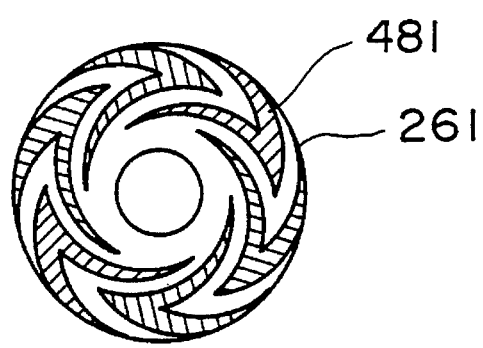
FIG. 10 is a plan view of the thrust plate shown in FIG. 5.

FIG. 9 is a front view of the thrust plate 261 and FIG. 10 is a plan view thereof.

The upper and lower annular surfaces (thrust receiving portion) of the thrust plate 261 and the upper and lower annular surfaces (thrust sliding portion) of the annular recess portion 431 constitute thrust hydrodynamic bearings A1 and A2, respectively. The upper and lower annular surfaces of the thrust plate 261 and the upper and lower annular surfaces of the annular recess 431 are facing each other in a parallel manner, respectively, with a slight axial gap, for example, to such a degree of 12 μm left therebetween. Over the full circumference in the outer peripheral portion of the upper and lower annular surfaces of the thrust plate 261 are provided herringbone-like grooves 481 and 501 which cause the lubricant interposed between the upper and lower annular surfaces of the annular recess 431 to produce a high pressure by the forward rotation of the rotary sleeve member 381 and the second bush 401. In this connection, such herringbone-like grooves may be provided on the upper and lower annular surfaces of the annular recess 431, and the adoption of any grooves other than spiral grooves are possible.

On the upper surface of the annular portion 381*b* is provided an upwardly opened annular groove 521 (having a section being substantially V-shaped in this embodiment). So-called oil repellant treatment is applied to the inner surface of the annular groove 521 so that the contact angle thereof with the lubricant in use becomes an obtuse angle. A rotor hub 561 is generally cylindrical in shape, and the base portion 561*b* is positioned inside the upper end portion of the peripheral wall 561*a*. The outwardly projection 561*c* is positioned outwardly of the lower end of the peripheral wall 561*b*. The rotor hub 561 is made concentric with the rotary sleeve member 381 by fitting and fixing the base portion 561*b* thereof onto the outer periphery of the upper projection 381*c* and annular portion 381*b* of the rotary sleeve member 381. Of course, the rotor hub 561 and the sleeve member 381 may be integrally formed with each other. Into the inner peripheral portion of the peripheral wall 561*a* is fitted and fixed a cylindrical rotor yoke 601 in which a cylindrical rotor magnet 581 is fitted and held opposite the stator core 191 with a radial gap left therebetween. On the base portion 561*b* is formed threaded holes 621 for screwing a clamper (not shown) to hold between it and the outer projection 561*c* a recording medium such as a hard disk or the like fitted onto the outer periphery of the peripheral wall 561*a*.

Since the upper portion of the sleeve portion 381*a* is enlarged in diameter to increase the strength, the enlarged diameter portion thereof can be held relatively strongly by a chuck 631, as shown in FIG. 6, for example. With the sleeve portion held in such a way, machining the outer peripheral surface of the peripheral wall 561*b* of the rotor hub 561, the upper surface of the outer projection 561*c* and the inner peripheral surface of the sleeve portion 381*a*, and working (sizing) for providing grooves such as herringbone grooves 461 or the like on the inner peripheral surface of the sleeve portion 381*a* can be continuously carried out using the chuck without changing the held position thereof.

Into the inner peripheral portion at the lower end of the rotor hub 561 is fitted and fixed a third bush 641, which is opposite a fourth bush 661 fitted and fixed onto the outer periphery of the bracket 101, with a radial gap left therebetween.

The radial hydrodynamic bearing R1 enables a radial displacement relative to the stationary support 141 during rotation of the rotary sleeve member 381 to be suppressed to a sufficiently small value, and the thrust hydrodynamic bearings A1 and A2 enable an axial displacement relative to the stationary support 141 during rotation of the rotary sleeve member 381 to be suppressed to a sufficiently small value.

The lubricant 681 in the thrust hydrodynamic bearing A1 attempts to flow through the gap between the first bush 301 and the second bush 401, that is, the gap between the shaft body and the sleeve body upwardly, namely, to the exterior of the motor due to capillarity. As shown in FIG. 7, the flow of the lubricant 681, which has come to flow from the thrust hydrodynamic bearing A1, is first checked by the surface tension of the lubricant 681 in the position where the gap between the first bush 301 and the second bush 401 becomes wider, that is, between the lower end edge of the second concave groove 421 and the lower end edge of the first concave groove 411, and thus the two concave grooves function as a first step of seal. In the case where the first step of seal is destroyed and the second concave groove 421 is filled with the lubricant 681, the flow is checked by the surface tension of the lubricant 681 between the lower end edge of the first concave groove 411 and the upper end edge of the second concave groove 421, as shown in FIG. 8, and thus the two concave grooves function as a second step of seal.

In this way, since it is possible for the two concave grooves to function as a two-step seal with a required length smaller than that of the seal provided in two steps at a vertical distance spaced from each other, dispersion of the lubricant 681 to the space outside the motor can effectively be prevented while the motor is made smaller in size. Moreover, since the first concave groove 411 and the second concave groove 421 provide a relatively large capacity of storage of a lubricant, a force corresponding to an expansion of the volume of the lubricant 681 due to a change in temperature is relatively large. In this embodiment, the sections of the first concave groove 411 and second concave groove 421 are half-circular (curved) in shape, and, therefore, working for forming the concave grooves is easy and the sealing effect is superior as compared with the case of the section of a square.

In addition, since the annular groove 521, to the inner surface of which oil repellent treatment is applied, is provided on the upper surface of the annular portion 381*b*, the lubricant 681, which attempts to exude out from between the annular portion 381*b*, upper projection 381*c* and the second bush 401, is effectively held within the annular groove 521 with a contact angle of an obtuse angle, thereby preventing the lubricant from exuding out to the exterior of the motor.

Figure 11:
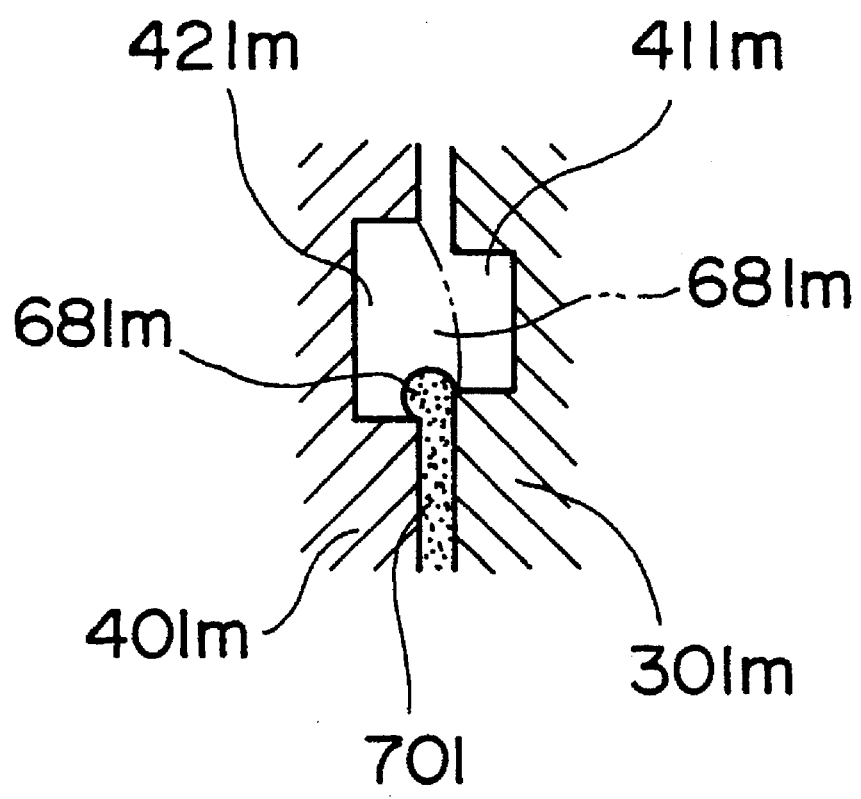
FIG. 11 is an enlarged sectional view of an essential portion of a fourth embodiment of the present invention.

FIG. 11 is an enlarged sectional view of an essential portion of a fourth embodiment according to the present invention.

In this embodiment, a peripheral first concave groove 301*m* having the section of a square which opens outwardly in the radial direction is provided on the outer periphery of the first bush 301*m* over the full periphery thereof, and the peripheral second concave groove 421*m* having the section of a square which opens inwardly in the radial direction is provided on the inner periphery of the second bush 401*m* over the full periphery thereof. In an arbitrary cross-sectional area, the axial position of the lower end edge of the first concave groove 411*m* is slightly higher than the lower end edge of the second concave groove 421*m*, and the axial position of the upper end edge of the first concave groove 411*m* is slightly lower than the upper end edge of the second concave groove 421*m*, the two concave grooves 411*m* and 421*m* being opposite each other with the positions of both end edges thereof offset from each other. Further, a groove 701 such as a spiral groove or the like is provided downwardly of the second concave groove 421*m* on the inner periphery of the second bush 401, so that the lubricant 681*m* flows downwards due to the forward rotation.

The lubricant 681*m*, which flows upwardly through the gap between the first bush 301 and the second bush 401, is checked by the surface tension of the lubricant 681*m* between the lower end edge of the second concave groove 421m and the lower end edge of the first concave groove 411m, as shown by the full line in FIG. 11, and thus the two concave grooves function as a first step of seal. In the case where this seal at the first step is destroyed and the second concave groove 421m is filled with the lubricant 681m, the lubricant 681m is checked by the surface tension thereof between the lower end edge of the first concave groove 411m and the upper end edge of the second concave groove 421m, as shown by the two-dot chain line, and thus the two concave grooves function as a second step of seal. Moreover, when the motor is rotated in forward rotation, the lubricant attempts to flows downwards through the groove 701, and, consequently, upward leakage of the lubricant 681m, that is, leakage thereof to the exterior of the motor is effectively prevented.

Figure 12:
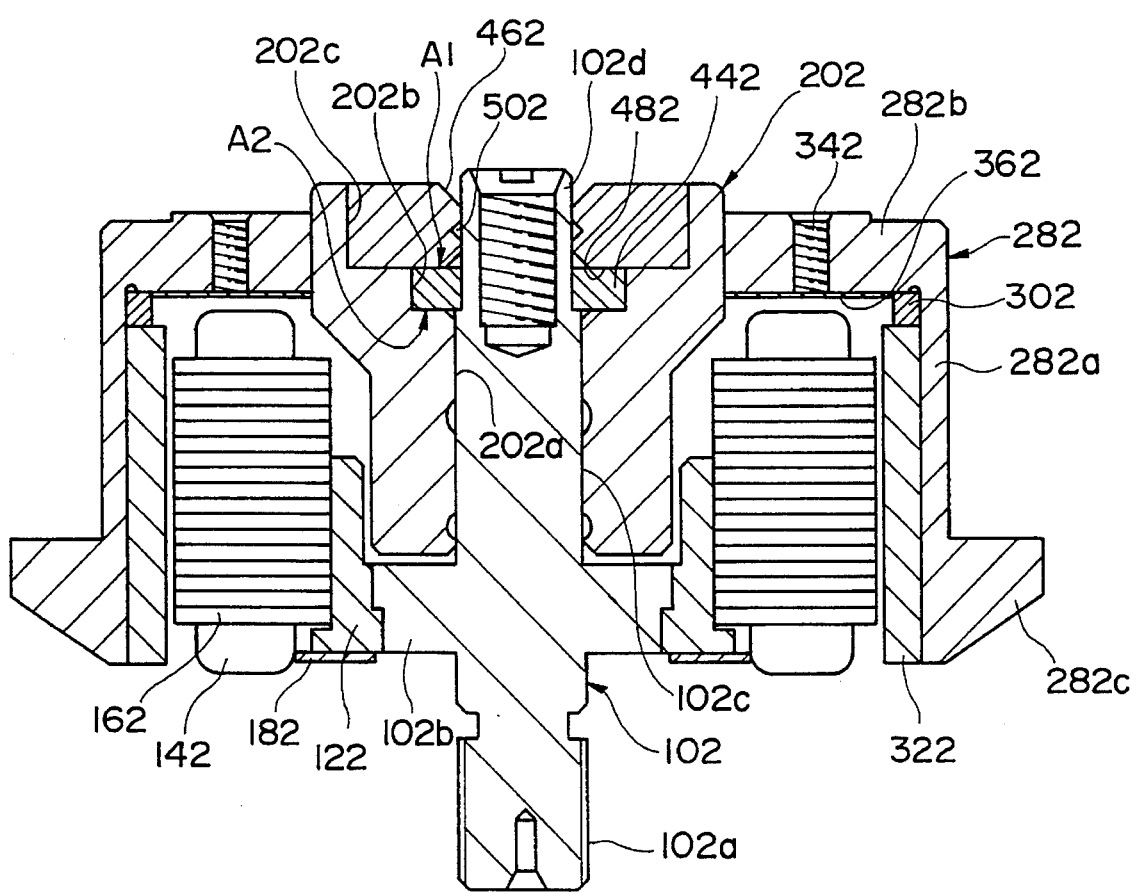
FIG. 12 is a half-sectional view showing a fifth embodiment of a spindle motor according to the present invention.
Figure 13:
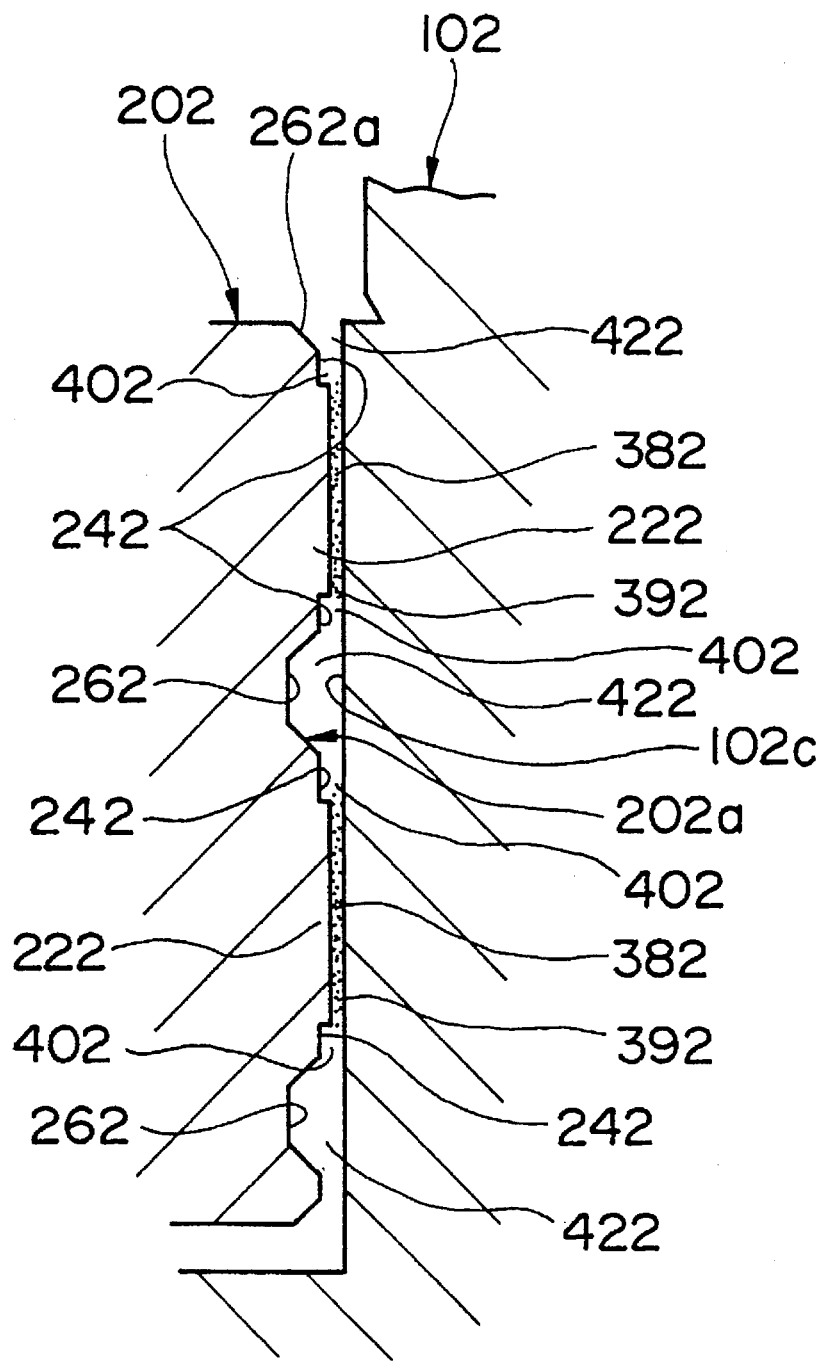
FIG. 13 is an enlarged view of an essential portion in FIG. 12.

FIG. 12 is a sectional view of a shaft stationary type spindle motor for driving recording media as a fifth embodiment of the present invention, and FIG. 13 is an enlarged view of an essential portion thereof. For recording media which become the objects, hard disks and a wide variety of recording media other than the hard disks can be cited.

A stationary support 102 (stationary part) has an external thread 102a on the outer peripheral portion used for securing the motor to the base board of a recording media driving device, an annular projection 102b above the external thread 102a and a radial receiving portion 102c in the form of a cylinder on the outer periphery above the annular projection 102b. Upwardly of the radial receiving portion 102c is formed a small diameter portion 102d reduced in diameter.

A substantially cylindrical first bush 122 is fitted and fixed onto the outer periphery of the annular projection 102b, for example, by means of shrinkage fit, calking or the like, and a stator core 162 around which a stator coil 142 is wound is secured to the outer periphery of the first bush 122. To the lower end surface of the first bush 122 is adhered and secured a flexible circuit board 182 to which a leader of the stator coil 142 is connected.

The annular projection 102b is integrally formed with the stationary support 102. Because, if the annular projection 102b is made as a separate body, for example, when the lower end of the stationary support 102 is inserted through a mounting hole in the base board of the recording media driving device and a nut is screwed onto the external threaded portion 102a to thereby lock the stationary support 102 on the base board, there is a danger of destroying the secured condition of the annular projection 102b.

A rotary sleeve member 202 is substantially cylindrical in shape and enlarged in the outer diameter of the upper end portion, and the inner peripheral portion thereof comprises a radial sliding portion 202a substantially cylindrical in shape and having a smaller diameter, a middle inner diameter portion 202b enlarged in diameter above the radial sliding portion 202a, and a large inner diameter portion 202c further enlarged in diameter above the middle inner diameter portion 202b. Herringbone grooves 222 are provided on the annular portions at the upper and lower ends of the radial sliding portion 202a. Lubricant holding annular portions 242 on the radial sliding portion 202a are short in the axial length and have each an inner diameter slightly larger than the diameter of the cylindrical inner peripheral surfaces formed with the herringbone grooves. Each of the lubricant holding annular portions 242 is adjacent at one side thereof as viewed in the axial direction to the herringbone grooves 222 and is adjacent at the other side to enlarged annular portions 262, 262 each having an inner diameter larger than that of the lubricant holding annular portion 242. The enlarged annular portion 262a positioned above the upper herringbone groove 222 out of the three enlarged annular portions 262, 262a is formed as a chamfering portion and oil repellent treatment is applied to the surface thereof, and the enlarged annular portions 262 positioned at the middle of the upper and lower herringbone grooves 222 and below the lower herringbone groove 222 are formed as grooves. Further, oil repellent treatment is applied to the inner surface of the lower enlarged annular portion 262.

A rotor hub 282 is made of ferromagnetic material and in the form of a substantially cup. The base portion 282b which opens in a circle in the center is positioned inwardly of the upper end portion of the peripheral wall 282a of the rotor hub 282, and the outer projection 282c is positioned outwardly of the lower end portion of the peripheral wall 282a. The rotor hub 282 is made concentric with the sleeve member 202 by fitting and fixing the base portion 282b onto the outer periphery of the upper end portion of the sleeve member 202. The rotor hub 282 and the sleeve member 202 may be integrally formed with each other.

A cylindrical rotor magnet 322 is fitted into and fixed to the inner periphery of the peripheral wall 282a with an annular spacer 302 for adjustment of height being held between it and the lower surface of the base portion 282b. A threaded hole 342 is provided on the base portion 282b to screw a clamper (not shown) for holding recording meda such as hard disks or the like fitted onto the outer periphery of the peripheral wall 282a, between the clamper and the outer projection 282c. A seal plate 362 adhered and secured to the lower surface of the base portion 282b serves to close the lower end opening of the threaded hole 342.

The sleeve member 202 is fitted onto the outer periphery of the stationary support 102, and liquid lubricant 392 is poured and interposed in the gap parts between the herringbone grooves 222 and the radial receiving portion 102c, that is, in the radial hydrodynamic bearing 382. With this bearing, forward rotation of the sleeve member 202 causes the lubricant 392 interposed therein to produce a pressure for supporting a load. Particularly, the herringbone grooves 222 enhance the pressure for supporting the load. Such herringbone grooves may be provided on the radial receiving portion 102c of the stationary support 102. Further, grooves other than the herringbone grooves may be adopted.

The gap parts between the lubricant holding annular portions 242 and the radial receiving portion 102c, that is, the lubricant holding gap parts 402 have radial gaps larger than those of the radial hydrodynamic bearings 382, and the gap parts between the enlarged annular portions 262 and the radial receiving portion 102c, that is, the enlarged gap parts 422 have radial gaps larger than those of the lubricant holding gap parts 402. The radial distance of each of the lubricant holding gap parts 402 is dimensioned to such a degree that the lubricant 392 leaked out from the radial hydrodynamic bearings 382 can be held in the lubricant holding gap parts 402 by capillarity.

The annular thrust plate 442 is fitted and fixed onto the lower end portion of the smaller diameter portion 102d of the stationary support 102. The upper and lower surfaces of the thrust plate 442 are made perpendicular to the radial receiving portion 102c of the stationary support 102. A second bush 462 is fitted into and fixed to the large inner diameter portion 202c of the sleeve member 202 with the inner peripheral portion spaced from the smaller diameter portion 102d leaving a slight radial gap. Into the annular recess 482, which opens inwardly in the radial direction and which is formed inside the inner diameter portion 202b by the second bush 462 and the sleeve member 202, is fitted the outer peripheral portion of a thrust plate 442. An annular groove 502 which opens inwardly in the radial direction is provided on the inner periphery of the second bush 462 in the axial middle position thereof, so that a labyrinth seal is constituted between it and the outer peripheral surface of the small diameter portion 102d of the stationary support 102. Oil repellent treatment is applied to the inner peripheral surface of the second bush 462.

The upper and lower annular surfaces (thrust receiving portion) of the thrust plate 442 and the upper and lower annular surfaces (thrust sliding portion) of the annular recess 482 constitute thrust hydrodynamic bearings A1 and A2, respectively. The upper annular surfaces of the thrust plate 442 and the upper and lower annular surfaces of the annular recess 482 are facing each other in a parallel manner, respectively, with a slight axial gap to a degree such as, for example, 12 μm left therebetween. Herringbone grooves (not shown) are provided in the upper and lower annular surfaces of the thrust plate 442 on the outer peripheral side thereof over the full periphery thereof. With the herringbone grooves, forward rotation of the sleeve member 202 and the second bush 462 causes the liquid lubricant poured and interposed between the upper and lower annular surfaces of the annular recess 482 to produce a high pressure. Such herringbone grooves may be provided on the upper and lower annular surfaces of the annular recess 482. Further, grooves other than the herringbone grooves can be adopted.

In this way, the sleeve member 202 and the rotor hub 282 are constituted so that they can be freely rotated relative to the stationary support 102 and the stator core 162 through a lubricant, with the stator core 162 and rotor magnet 322 facing each other with a radial gap left therebetween. The radial hydrodynamic bearings 382 enable a radial displacement of the sleeve member 202 relative to the stationary support 102 during rotation of the sleeve member 202 to be suppressed to a sufficiently lower value, and the thrust hydrodynamic bearings A1 and A2 enable an axial displacement of the sleeve member 202 relative to the stationary support 102 during rotation of the sleeve member 202 to be suppressed to a sufficiently small value.

Rotation of the sleeve member 202 relative to the stationary support 102 causes the lubricants 392 placed in the radial hydrodynamic bearings 382 to generally produce pressures for supporting a radial load, and, in the case where the lubricant 392 has leaked out into the lubricant holding gap parts 402 adjacent to the radial hydrodynamic bearings 382, also causes the lubricant 392 to be taken therein.

When rotation is stopped and any relative inclination is produced between the stationary support 102 and the sleeve member 202, the excess lubricant 392 which can not be held in the radial hydrodynamic bearings 382 leaks out into the lubricant holding gap parts 402 adjacent to the radial hydrodynamic bearings 382. However, the lubricant 392 is held in the lubricant holding gap parts 402 by capillarity. Even if the lubricant 392 attempts to further flow out into the enlarged gap parts 422 adjacent thereto, such an outflow is prevented by the surface tension of the lubricant 392. Further, the rabyrinth seal between the inner peripheral portion and the smaller diameter portion 102d of the stationary support 102 prevents the lubricant from leaking out of the thrust hydrodynamic bearing A1. This effectively prevents the lubricant from leaking out and the space outside the motor from being stained.

Figure 14:
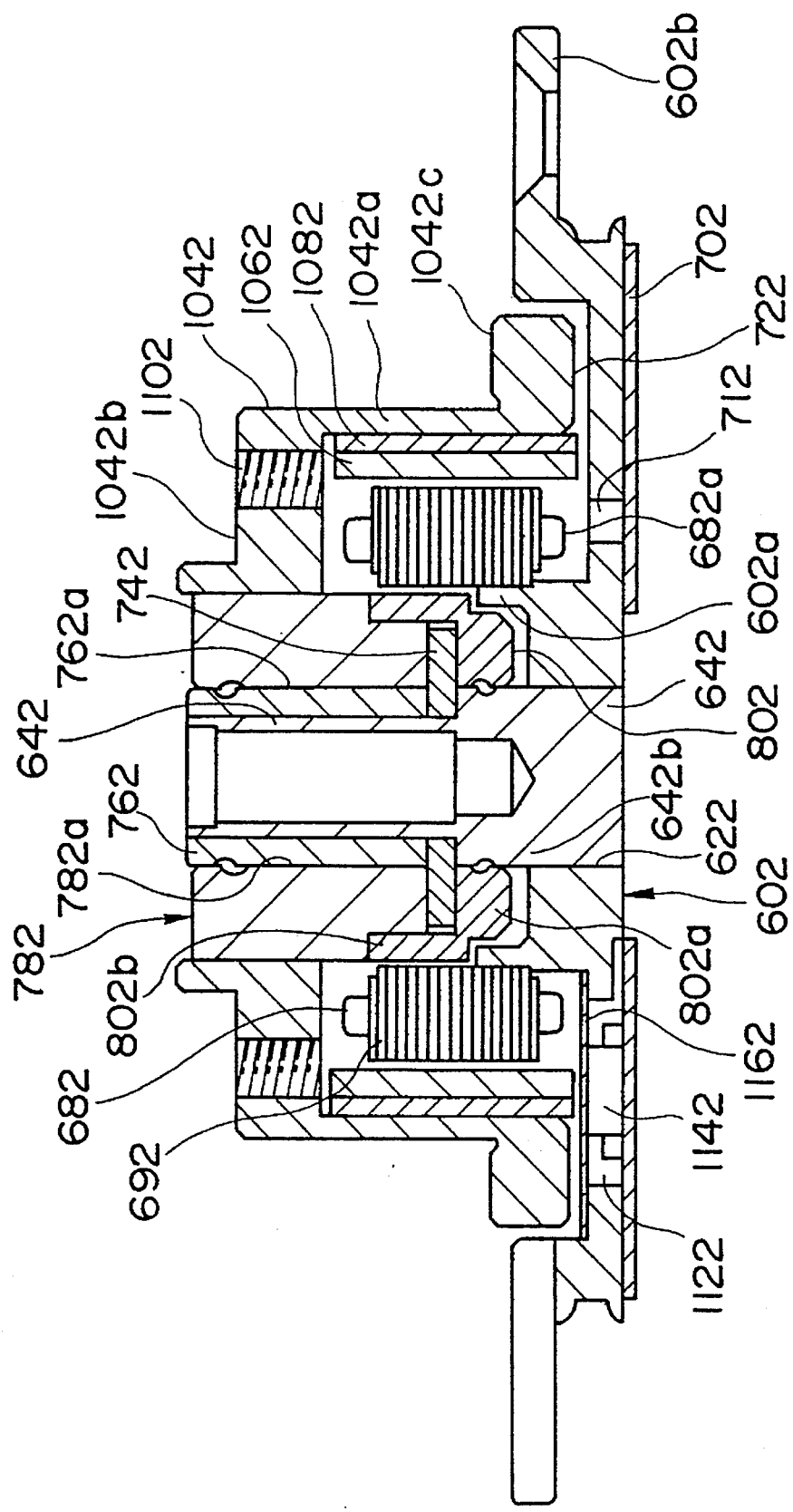
FIG. 14 is a half-sectional view showing a sixth embodiment of the invention.
Figure 15:
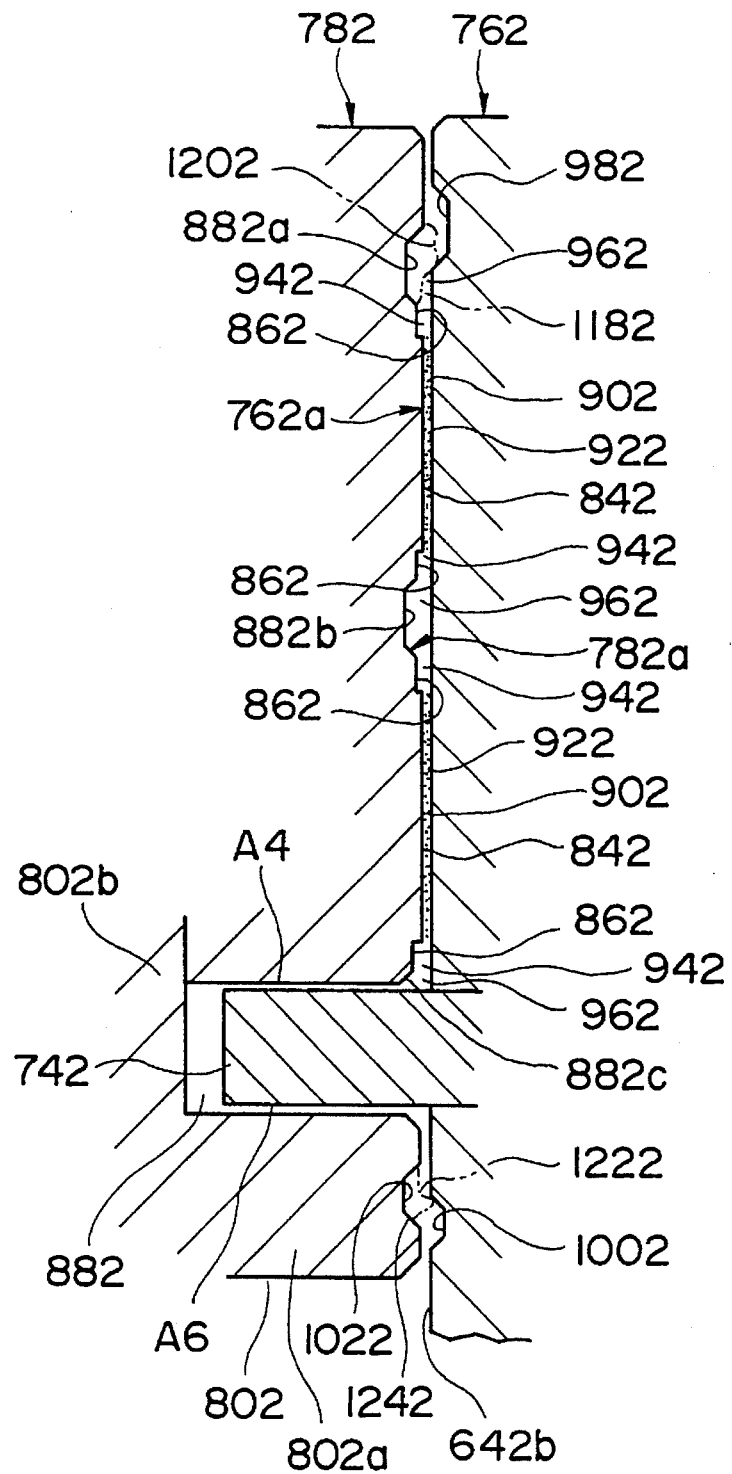
FIG. 15 is an enlarged view of an essential portion in FIG. 14.

FIG. 14 is a sectional view of an shaft stationary type spindle motor for driving recording media as a sixth embodiment of the present invention, and FIG. 15 is an enlarged view of an essential portion thereof. For recording media which become the objects, hard disks or a wide variety of recording media other than the hard disks can be cited.

A substantially cylindrical stationary support 642 is provided vertically on a bracket 602 (stationary part) by fitting and fixing the lower end of the stationary support 642 into the fitting hole 622 provided at the middle of the bracket 602.

On the outer periphery of the bracket 602 outside the fitting hole 622 thereof is provided an upwardly extending annular projection 602a, and to the outer periphery thereof is secured a stator core 692 around which a stator coil 682 is wound. A leader 682a of the stator coil 682 is connected to a circuit board 702 secured to the lower surface of the bracket 602 of the stator coil 682 through a leading-out hole 712 provided on the bracket 602. The bracket 602 is formed with a flange 602b on the outer peripheral portion and forms an annular groove 722 between the annular projection 602a.

The stationary support 642 has a small diameter portion 642a reduced in diameter at the upper portion thereof. An annular thrust plate 742 is fitted and fixed onto the lower end portion of the small diameter portion, and a cylinder 762 is fitted and fixed onto the small diameter portion 642a above the thrust plate 742. The upper and lower annular surfaces of the radially outwardly extending portion of the thrust plate 742 are perpendicular to the radial receiving portion 762a (outer periphery in the form of a substantially cylindrical surface) which constitutes the outer peripheral portion of the cylinder 762. In this embodiment, these stationary support 642 and cylinder 762 constitute a shaft body.

A rotary sleeve member 782 is fitted onto the outer periphery of the cylinder 762, and the radial sliding portion 782a in the form of a substantially cylindrical surface, which constitutes the inner peripheral portion of the rotary sleeve member 782 (inner periphery in the form of a substantially cylindrical surface), is opposite the radial receiving portion 762a. A bush 802 comprises an annular base portion 802a and a peripheral wall 802b extending upwardly of the outer periphery thereof, and the upper portion of the peripheral wall 802b of the bush 802 is fitted and fixed onto the lower portion of the outer periphery of the sleeve member 782. Thus, the lower end surface of the rotary sleeve member 782, the upper surface of the annular base portion 802a of the bush 802 and the inner peripheral surface of the peripheral wall 802b define an annular recess 822 which opens inwardly in the radial direction and into which the thrust plate 742 is fitted. In this embodiment, these rotary sleeve member 782 and the bush 802 constitute a sleeve body.

Herringbone grooves 842 are provided on the annular portions at the upper and lower portions of the radial sliding portion 782a. Lubricant holding annular portions 862 in the radial sliding portion 782a are short in the axial length and have each an inner diameter larger than that of the cylindrical inner peripheral surface formed with herringbone grooves 842. Each of the lubricant holding annular portions 862 is adjacent at one side as viewed in the axial direction to the herringbone grooves 842 and adjacent at the other side to enlarged annular portions 882a, 882b and 882c each having an inner diameter larger than that of the lubricant holding annular portions 862. The enlarged annular portions 882a and 882b positioned above the upper herringbone groove 842 and at the middle of the upper and lower herringbone grooves 842 out of the three enlarged annular portions 882a, 882b and 882c are formed in the form of grooves, and the enlarged annular portion 882c positioned below the lower herringbone groove 842 is formed as a chamfering portion.

A liquid lubricant 922 is poured and interposed in the gap parts between the herringbone grooves 842 and the radial receiving portion 762a, that is, in radial hydrodynamic bearings 902. With each of such radial hydrodynamic bearings, forward rotation of the sleeve member 782 causes the lubricant 922 interposed therein to produce a load supporting pressure. Particularly, herringbone grooves 842 enhance the load supporting pressure. Such herringbone grooves may be provided on the radial receiving portion 762a of the cylinder 762. Further, grooves other than the herringbone grooves may be adopted.

The gap parts between the lubricant holding annular portions and the radial receiving portion 762a, that is, the lubricant holding gap parts 942 have radial gaps larger than those of the radial hydrodynamic bearings 902, and the gap parts between the enlarged annular portions 882a, 882b and 882c and the radial receiving portion 762a, that is, the enlarged gap parts 962 have radial gaps larger than those of the lubricant holding gap parts. The radial distance of each of the lubricant holding gap parts 942 is dimensioned to such a degree that the lubricant 922 leaked out of the radial hydrodynamic bearing 902 can be held in the lubricant holding gap part 942 by capillarity.

The upper and lower annular surfaces (thrust receiving portion) of the thrust plate 742 and the upper and lower annular surfaces (thrust sliding portion) of the annular recess 822 constitute thrust hydrodynamic bearings A4 and A6, respectively. The upper and lower annular surfaces of the thrust plate 742 and the upper and lower annular surfaces of the annular recess 822 are facing each other in a parallel manner, respectively, with a slight axial gap, for example, approximately 12 μm left therebetween. Herringbone grooves (not shown) are provided on the upper and lower annular surfaces of the thrust plate 742 at the outer peripheral sides thereof over the full periphery. With each of these herringbone grooves, forward rotation of the sleeve member 782 and bush 802 causes the liquid lubricant poured and interposed between the upper and lower annular surfaces of the annular recess 822 to produce a high pressure. Such herringbone grooves may be provided on the upper and lower annular surfaces of the annular recess 822. Further, grooves other than the herringbone grooves can be adopted.

On the outer peripheral surface of the radial receiving portion 762a of the cylinder 762 is provided a first concave groove 982 extending over the full periphery thereof. In an arbitrary cross-section, the axial position of the lower end edge of the first concave groove 982 corresponds to substantially the middle of the enlarged annular portion 882a, and the axial position of the upper end edge of the enlarged annular portion 882a corresponds to substantially the middle of the first concave groove 982, so that they are facing each other with the positions of both end edges of the two offset from each other. Further, oil repellent treatment is applied to the inner surfaces of the enlarged annular portion 882a and first concave groove 982.

Moreover, on the upper portion of the outer peripheral surface of the base portion 642b of the stationary support 642 is provided a peripheral second groove 1002 extending over the full periphery, and on the inner peripheral surface of the base 802a of the bush 802 which opens inwardly in the radial direction is provided a third concave groove 1022 extending over the full periphery thereof. In an arbitrary cross-section, the axial position of the upper end edge of the second groove 1002 corresponds to substantially the middle of the third concave groove 1022, and the axial position of the lower end edge of the third concave groove 1022 corresponds to substantially the middle of the second concave groove 1002, so that they are facing each other with the positions of both end edges of the two offset from each other. Further, oil repellent treatment is applied to the inner peripheral surfaces of the third concave groove 1022 and second concave groove 1002.

A rotor hub 1042 is in the form of a substantially cup. The base portion 1042b which opens in a circle in the center is positioned inwardly of the upper end portion of the peripheral wall 1042a of the rotor hub 1042, and the outer projection 1042c is positioned outwardly of the lower end of the peripheral wall 1042a. The rotor hub 1042 is made concentric with the sleeve member 782 by fitting and fixing the base portion 1042b thereof onto the upper portion of the sleeve member 782. The rotor hub 1042 and sleeve member 782 may be integrally formed with each other. Into the inner peripheral portion of the peripheral wall 1042a is fitted and fixed a rotor yoke 1082 in which a cylindrical rotor magnet 1062 is fitted and held. Threaded holes 1102 are formed on the base portion 1042b to screw a clamper (not shown) for holding recording media such as hard disks fitted onto the peripheral wall 1042a, between the clamper and the outer projection 1042c.

In this way, the sleeve member 782, bush 802 and rotor hub 1042 are constituted so that they can be freely rotated relative to the stationary support, cylinder 762 and stator core 692 through a lubricant, with the stator core 692 and rotor magnet 1062 opposite each other at a radial gap. The radial hydrodynamic bearings 902 enable a radial displacement of the sleeve member 782 relative to the stationary support 642 during rotation thereof to be suppressed to a sufficiently small value, and the axial hydrodynamic bearings A4 and A6 enable an axial displacement of the sleeve member 782 and bush 802 relative to the stationary support 102 and cylinder 762 during rotation thereof to be suppressed to a sufficiently small value.

Moreover, HallIC 1142 for detecting the position of magnetic poles and secured to the circuit board 702 is positioned within a through-hole 1122 provided in the bracket 602, and the HallIC 1142 is opposite the lower end portion of the rotor magnet 1062 through a seal plate 1162 to close the upper opening of the through-hole 1122.

Rotation of the sleeve member 782 relative to the cylinder 762 causes the lubricant 922 interposed in the radial hydrodynamic bearings to produce generally a load supporting pressure in the radial direction, and, at the same time, in the case where the lubricant 922 has already leaked out into the adjacent lubricant holding gap parts 942 at the time of stoppage of rotation, causes the lubricant 922 therein to be taken into the radial hydrodynamic bearings 902.

In the case where the rotation is stopped and a relative inclination is produced between the cylinder 762 and the sleeve member 782, the excess lubricant 922 which can not be held in the radial hydrodynamic bearings 902 leaks out into the lubricant holding gap parts 942 adjacent to the radial hydrodynamic bearings 902. However, the lubricant 922 is held in the lubricant holding gap parts 942 by capillarity, and, therefore, even if the lubricant 922 attempts to further flow out into the adjacent enlarged gap parts 962, it is prevented by the surface tension of the lubricant 922.

Further, the lubricant 922 in the upper radial hydrodynamic bearing 902 flowing out further upwardly from the lubricant holding gap part 942 above the radial hydrodynamic bearing 902 is prevented between the lower end edge of the enlarged annular portion 882a and the lower end edge of the first concave groove 982 by the surface tension of the lubricant 922, as shown by the two-dot chain line 1182 in FIG. 15. This functions as a first step of seal, and, even in case the first step of seal is destroyed and the enlarged annular portion 882a is filled with the lubricant 922, flow of the lubricant 922 is checked between the upper end edge of the enlarged annular portion 882a and the lower end edge of the first concave groove 982 by the surface tension of the lubricant 922, and thus functions as a second seal.

The lubricant in the axial hydrodynamic bearing A6 attempts to flow down through the gap between the base portion 642b of the stationary support 642 and the base portion 802a of the bush 802 by capillarity or the like. The flow of the lubricant which has flown downwardly from the axial hydrodynamic bearing A6 is first checked in the position where the gap between the base portion 642b and the base portion 802a become wider, that is, between the upper end edge of the third concave groove 1022 and the upper end edge of the second concave groove 1002 by the surface tension of the lubricant, as shown by the two-dot chain line 1222 in FIG. 15, and thus functions as a first step of seal. Even in the case where the first step of seal is destroyed and the third concave groove 1022 is filled with the lubricant, the flow of the lubricant is checked between the lower end edge of the third concave groove 1022 and the upper end edge of the second concave groove 1002 by the surface tension of the lubricant, as shown by the two-dot chain line 1242, and thus functions as a second step of seal.

In addition, the outer peripheral surface of the base portion 802a of the bush 802 is opposite the inner peripheral surface of the annular projection 602a with a slight radial gap left therebetween, and the outer peripheral surface of the peripheral wall 802b of the bush 802 is opposite the inner peripheral surface of the stator core 692 with a slight radial gap left therebetween, so that the bush 802 and the bracket 602 and stator core 692 opposite the bush 802 provide a labyrinth seal-like effect. This can surely prevents the lubricant from dispersing into the exterior of the motor.

The seal due to the enlarged annular portion 882a and first concave groove 982 and the seal due to the third concave groove 1022 and second concave groove 1002 function as a two-step seal with a required length smaller than the length of the seals provided in two steps with a vertical distance spaced from each other, and, accordingly, dispersion of the lubricant into the space outside the motor can effectively be prevented while the motor is made smaller in size.

Further, since the enlarged annular portion 882a and the first concave groove 982 or the third concave groove 1022 and the second concave groove 1002 provide a relatively large capacity of storing a lubricant, a force corresponding to expansion of the volume of the lubricant due to a change in temperature is greater.

In this connection, the relation of the vertical positions in the descriptions regarding the six embodiments as mentioned above is made only for convenience of explanation on the basis of the drawings, and the actual state of use or the like is not limited thereby.

According to the fifth and sixth embodiments constituted as mentioned above, even in the case where the excess lubricant, which can not be held in the radial hydrodynamic bearings at the time of stoppage of the motor, leaks out into the lubricant holding gaps adjacent to the radial hydrodynamic bearings, the lubricant is held in the lubricant holding gap parts by capillarity, and, accordingly, can be prevented from flowing out into the enlarged gap parts adjacent to the lubricant holding gap parts. Therefore, the lubricant can effectively be prevented from leaking out and staining the space outside the motor.

Figure 16:
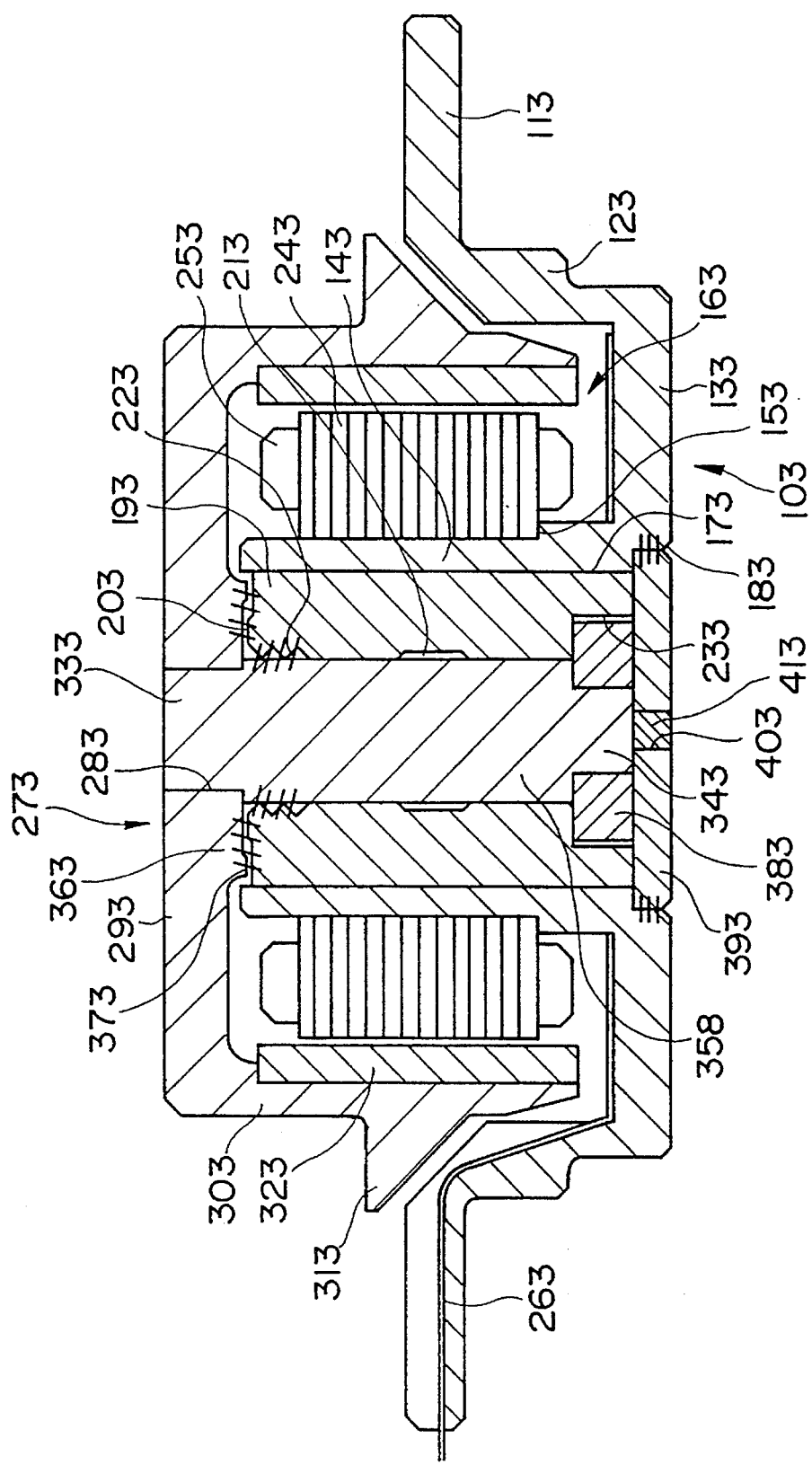
FIG. 16 is a sectional view showing a seventh embodiment of a spindle motor according to the invention.

FIG. 16 shows a seventh embodiment of a spindle motor according to the present invention. Referring to the drawing, the spindle motor includes a bracket 103 (stationary part) having a cross-section of a substantially concave form. The bracket 103 comprises a ring-shaped flange 113 provided on the outermost periphery; an outer peripheral wall 123 positioned inside the flange 113; an annular bottom 133 formed at the inner and lower portions of the outer peripheral wall 123; a cylindrical inner peripheral wall 143 provided on the inner periphery of the bottom 133; and a stepped portion 153 formed on the outer periphery of the inner peripheral wall 143.

In the center of the inner peripheral wall 143 of the bracket 103 is formed a hole 173 vertically bored therethrough, and at the lower opening end of the hole 173 is provided a large diameter portion 183. A hollow cylindrical stationary sleeve 193 which opens at both ends is press-fitted into and fixed to the hole 173 so that the upper end of the stationary sleeve 193 becomes slightly lower than the upper end of the inner peripheral wall 143 and the lower end thereof is opposite the large diameter portion 183.

An annular convex portion 203 is formed on the upper end of the stationary sleeve 193 at the inner peripheral side thereof, and an annular concave groove 213 for storing a lubricant therein is formed at the middle position of the inner peripheral surface. In addition, herringbone-like grooves (not shown) are formed on the inner peripheral surface of the stationary sleeve 193 above and below the concave groove 213, and thus constitutes radial hydrodynamic bearings, as the grooves are filled with a lubricant. Further, on the upper side of the inner peripheral surface of the sleeve 193 is formed a seal 223 composed of a plurality of concave grooves.

Moreover, an annular cut-out portion 233 is formed on the lower end of the inner peripheral surface of the stationary sleeve 193. To the outer peripheral surface of the inner peripheral wall 143 of the bracket 103 on the stepped portion 153 thereof is secured a stator core 243 around which a stator coil 253 is wound. A means for supplying a current to the stator coil 253 consists of a flexible printed wiring board 263 in this embodiment, which is adhered and secured to the bottom 133 of the bracket 103 and extends at one end thereof to the exterior.

In FIG. 16, Reference 273 indicates a substantially bowl-shaped rotor hub, which comprises a base portion 293 having a fitting hole 283 in the center; an outer wall depending from the outer periphery of the base portion 293; and a projection 313 extending outwardly of the outer wall 303. In this embodiment, the projection 313 is provided from the lower end of the outer wall 303 to approximately ½ the height of the outer wall 303, and a plurality of hard desks are fitted and fixed onto the outer wall 303 above the projection 313 with spacers interposed therebetween.

Further, in the inner periphery of the outer wall 303 in the position opposite the stator core 243 is placed a cylindrical rotor magnet 323, which is fixed to the outer wall 303. A rotary support 353 formed at the upper and lower ends with upper and lower small diameter portions 333 and 343, respectively, is fitted and fixed concentrically with the rotor hub 273.

In order to fit and fix the upper small diameter portion 333 of the stationary support 353 into the fitting hole 283, a shrinkage fit method is adopted which comprises heating the rotor hub 273 and inserting the upper small diameter portion 333 into the fitting hole 283 thereof. A downwardly projecting large thickness portion 363 is formed on the inner surface of the base portion 293 and on the outer peripheral portion outside the fitting hole 283, and an annular projection 373 extending toward the upper end surface of the sleeve 193 is formed on the lower surface of the large thickness portion 363 and outside the convex portion 203 formed on the upper end surface of the stationary sleeve 193, these convex portion 203 and projection 373 forming a labyrinth seal.

On the other hand, an annular thrust plate 383 is press-fitted and fixed onto the lower small diameter portion 343 of the rotary support 353, and spiral grooves (not shown) are provided on the upper and lower surfaces of the thrust plate 383, thus constituting a thrust hydrodynamic bearing as the grooves are filled with a lubricant. With the thrust plate 383 being press-fitted and fixed onto the lower diameter portion 343 of the rotary support 353, a base plate 393 is press-fitted into and fixed to the large diameter portion 183 provided at the opening end of the hole 173 of the bracket 103, so that the hydrodynamic bearings (thrust and radial) filled with a lubricant are closed.

The base plate 393 is in the form of a disk and provided in the center with an air drain hole 403, in which a pin 413 is press-fitted and which is closed after press-fitting and fixing the base plate 393.

With the spindle motor constituted as mentioned above, the constructions of the above-mentioned embodiments can be adopted in the seal 223, and, at the same time, since the base plate 393 which closes the hydrodynamic bearings is provided with the air drain hole 403 which is closed after the base plate 393 has been press-fitted and fixed, when the base plate 393 is press-fitted into the stator side, the air which has existed on the inner surface of the base plate 393 is forced toward the center thereof as it is being press-fitted, and discharged to the exterior through the air drain hole 403, so that the air is prevented from entering into the lubricant.

What is claimed:

1. A spindle motor for driving recording media comprising:

a rotary sleeve;

a rotor hub which is integrally rotated with said rotary sleeve;

a stationary part;

a stationary support disposed at said stationary part and projected almost vertically thereof, said rotary sleeve being fitted onto a stationary sleeve of said stationary support;

radial hydrodynamic bearings filled with a lubricant provided on relative sliding surfaces of said rotary sleeve and said stationary sleeve, and a thrust hydrodynamic bearing located below said radial hydrodynamic bearings filled with a lubricant provided on relative sliding surfaces of said rotary sleeve and said stationary support;

first and second annular grooves respectively formed on an outer peripheral surface of said stationary support and on an inner peripheral surface of a bushing of said rotary sleeve axially spaced from said radial and thrust hydrodynamic bearings, said first and second annular grooves disposed so that the grooves partially overlap each other in the axial direction, said first annular groove located axially closer to said radial and thrust hydrodynamic bearings relative to said second annular groove;

a first gap defined between said relative sliding surfaces of said stationary support and said bushing;

a second gap defined between the first annular groove and a radially opposite relative sliding surface;

a third gap defined between said annular grooves, said third gap formed to be larger in the radial direction than said second gap, said second gap formed to be larger in the radial direction than said first gap, and said first, second and third gaps disposed in this sequence in the direction of moving axially away from said radial and thrust hydrodynamic bearings;

a first means for suppressing the outflow of said lubricant by utilizing surface tension of the lubricant, said first means formed between respective edges of the first and second annular grooves which are closest to the radial and thrust hydrodynamic bearings in the axial direction; and a second means for suppressing the outflow of said lubricant by utilizing surface tension of the lubricant, said second means formed between an edge furthest away from the radial and thrust hydrodynamic bearings in the axial direction of the first annular groove, and an edge closest to the radial and thrust hydrodynamic bearings in the axial direction of the second annular groove.

2. A spindle motor as defined in claim 1, further including a spiral groove to cause said lubricant to be circulated toward said radial and thrust hydrodynamic bearings, said spiral groove provided on one of the surfaces selected from the group including an outer peripheral surface of said stationary support and an inner peripheral surface of said bushing, said spiral groove located between said radial and thrust hydrodynamic bearings and both said first and second annular grooves.

3. A spindle motor as defined in claim 1, wherein the approximate shape of said first and second annular grooves are selected from the group including a trapezoidal shape and a concave shape.

4. A spindle motor as defined in claim 3, wherein said first and second annular grooves are longer in a radial direction than said first gap.

5. A spindle motor as defined in claim 1, wherein said first and second annular grooves are approximately semi-circular in shape.

6. A spindle motor as defined in claim 1, wherein a plurality of said radial hydrodynamic bearings are provided in the lengthwise axial direction of said stationary sleeve with a predetermined space therebetween.

7. A spindle motor as defined in claim 1, wherein a disk-shaped thrust bearing having a plane substantially perpendicular to the lengthwise axial direction of said stationary support is provided at said stationary support, said rotary sleeve having a recess in which said thrust bearing is fitted at one end thereof, and further including the bushing fixed at said rotary sleeve so that the bushing stops-up said recess, said radial hydrodynamic bearings formed between said stationary sleeve and said rotary sleeve, and said thrust hydrodynamic bearing formed among upper and lower planes of said thrust bearing, said recess of said rotary sleeve and said bushing.

8. A spindle motor as defined in claim 1, wherein said rotary sleeve and said bushing are fixed with a thermo-hardening adhesive including an anaerobic hardening agent.

9. A spindle motor for driving recording media comprising:

a rotary sleeve;

a rotor hub which is integrally rotated with the rotary sleeve;

a stationary part;

a stationary support disposed at said stationary part and projected almost upwards thereof, said rotary sleeve being fitted onto a stationary sleeve of said stationary support;

radial hydrodynamic bearings filled with a lubricant provided on relative sliding surfaces of said rotary sleeve and said stationary sleeve, and a thrust hydrodynamic bearing located below said radial hydrodynamic bearings filled with a lubricant provided on relative sliding surfaces of said rotary sleeve and said stationary support;

first and second annular grooves respectively formed on an outer peripheral surface of said stationary support and on an inner peripheral surface of a bushing of said rotary sleeve axially spaced from said radial and thrust hydrodynamic bearings, said first and second annular grooves disposed so that the grooves partially overlap each other in the axial direction, said first annular groove located axially closer to said radial and thrust hydrodynamic bearings relative to said second annular groove;

a first gap defined between said relative sliding surfaces of said stationary support and said bushing;

a second gap defined between the first annular groove and a radially opposite relative sliding surface;

a third gap defined between said annular grooves, said third gap formed to be larger in the radial direction than said second gap, said second gap formed to be larger in the radial direction than said first gap, and said first, second and third gaps disposed in this sequence in the direction of moving axially away from said radial and thrust hydrodynamic bearings;

said first annular groove forming a first space of accommodation of the lubricant such that the lubricant swells out due to the surface tension of the lubricant to suppress the outflow of said lubricant between respective edges of the first and second annular grooves which are closest to the radial and thrust hydrodynamic bearings in the axial direction; and said second annular groove forming a second space of accommodation of the lubricant such that the lubricant swells out due to the surface tension of the lubricant to suppress the outflow of said lubricant between an edge of the first annular groove furthest from the radial and thrust hydrodynamic bearings in an axial direction and an edge of the second annular groove closest to the radial and thrust hydrodynamic bearings in an axial direction.

10. A spindle motor as defined in claim 9, further including a spiral groove to cause said lubricant to be circulated toward said radial and thrust hydrodynamic bearings, said spiral groove provided on one of the surfaces selected from the group including an outer peripheral surface of said stationary support and an inner peripheral surface of said bushing, said spiral groove located between said radial and thrust hydrodynamic bearings and both said first and second annular grooves.

11. A spindle motor as defined in claim 9, wherein the approximate shape of said first and second annular grooves are selected from the group including a trapezoidal shape and a concave shape.

12. A spindle motor as defined in claim 11, wherein said first and second annular grooves are longer in a radial direction than said first gap.

13. A spindle motor as defined in claim 9, wherein said first and second annular grooves are approximately semicircular in shape.

14. A spindle motor as defined in claim 9, wherein a plurality of said radial hydrodynamic bearings are provided in the lengthwise axial direction of said stationary sleeve with a predetermined space therebetween.

15. A spindle motor as defined in claim 9, wherein a disk-shaped thrust bearing having a plane substantially perpendicular to the lengthwise axial direction of said stationary support is provided at said stationary support, said rotary sleeve having a recess in which said thrust bearing is fitted at one end thereof, and further including the bushing fixed at said rotary sleeve so that the bushing stops-up said recess, said radial hydrodynamic bearings formed between said stationary sleeve and said rotary sleeve, and said thrust hydrodynamic bearing formed among upper and lower planes of said thrust bearing, said recess of said rotary sleeve and said bushing.

16. A spindle motor as defined in claim 9, wherein said rotary sleeve and said bushing are fixed with a thermohardening adhesive including an anaerobic hardening agent.

* * * * *